United States Patent
Betan et al.

(10) Patent No.: US 11,750,897 B2
(45) Date of Patent: Sep. 5, 2023

(54) GENERATING SEQUENTIAL VISUAL NARRATIVES

(71) Applicant: STUDEO REALTY MARKETING INC., Toronto (CA)

(72) Inventors: Nir Betan, Toronto (CA); Rebecca Eva Rose, Toronto (CA); Brodie Hanbuch, Toronto (CA)

(73) Assignee: STUDEO REALTY MARKETING INC., Markham (CA)

( * ) Notice: Subject to any disclaimer, the term of this patent is extended or adjusted under 35 U.S.C. 154(b) by 0 days.

(21) Appl. No.: 16/645,401

(22) PCT Filed: Sep. 6, 2018

(86) PCT No.: PCT/IB2018/056817
§ 371 (c)(1),
(2) Date: Mar. 6, 2020

(87) PCT Pub. No.: WO2019/049068
PCT Pub. Date: Mar. 14, 2019

(65) Prior Publication Data
US 2020/0286130 A1  Sep. 10, 2020

Related U.S. Application Data

(60) Provisional application No. 62/555,376, filed on Sep. 7, 2017.

(51) Int. Cl.
*H04N 21/85* (2011.01)
*H04N 21/854* (2011.01)
(Continued)

(52) U.S. Cl.
CPC .......... *H04N 21/854* (2013.01); *G06F 18/24* (2023.01); *G06F 40/279* (2020.01); *G06F 40/30* (2020.01);
(Continued)

(58) Field of Classification Search
CPC .................. G06Q 30/0276; H04N 21/854
See application file for complete search history.

(56) References Cited

U.S. PATENT DOCUMENTS 6,687,404 B1 * 2/2004 Hull ................... G06V 30/40
382/226
6,839,880 B1  1/2005 Morse et al.
(Continued)

FOREIGN PATENT DOCUMENTS

WO  WO-2012100173 A1 *  7/2012  ........... G06F 16/958

OTHER PUBLICATIONS

ISA/CA, International Search Report and Written Opinion, dated Dec. 27, 2018, re PCT International Patent Application No. PCT/IB2018/056817.

(Continued)

*Primary Examiner* — Scott C Anderson
(74) *Attorney, Agent, or Firm* — Perry + Currier Inc.

(57) ABSTRACT

A system for generating a sequential visual narrative is provided. The system includes a media analyzer to obtain media and descriptive data pertaining to a subject and to categorize the media into narrative categories. The system includes a description generator to process the descriptive data and the narrative categories to generate text descriptions describing the subject in relation to the media. The system includes a visual display generator to sequence the media in a narrative sequence, map the narrative sequence to a display layout, and to generate and output a visual display including the text descriptions in visual association with the media.

21 Claims, 12 Drawing Sheets

(51) Int. Cl.
*G06N 20/00* (2019.01)
*G06F 40/279* (2020.01)
*G06F 40/30* (2020.01)
*G06Q 30/0241* (2023.01)
*H04N 21/234* (2011.01)
*H04N 21/81* (2011.01)
*H04N 21/8549* (2011.01)
*G06F 18/24* (2023.01)

(52) U.S. Cl.
CPC ......... *G06N 20/00* (2019.01); *G06Q 30/0276* (2013.01); *H04N 21/23418* (2013.01); *H04N 21/812* (2013.01); *H04N 21/8133* (2013.01); *H04N 21/8549* (2013.01)

(56) References Cited

U.S. PATENT DOCUMENTS

| | | | |
|---|---|---|---|
| 7,526,424 | B2 | 4/2009 | Corston-Oliver et al. |
| 8,468,448 | B2 | 6/2013 | Damera-Venkata |
| 8,831,360 | B2 | 9/2014 | Cok |
| 9,165,301 | B2 * | 10/2015 | Matthys ............. G06Q 30/0277 |
| 2011/0234613 | A1 | 9/2011 | Hanson et al. |
| 2012/0054600 | A1 | 3/2012 | McCurdy et al. |
| 2012/0130705 | A1 * | 5/2012 | Sun ........................ G06F 40/30 704/9 |
| 2012/0130816 | A1 * | 5/2012 | Sakamoto ............. G06Q 30/02 705/14.55 |
| 2014/0071133 | A1 * | 3/2014 | Chu ..................... G06T 11/206 345/440 |
| 2015/0186953 | A1 | 7/2015 | Gross |
| 2015/0193383 | A1 | 7/2015 | Rao et al. |
| 2015/0269264 | A1 | 9/2015 | Bolen |
| 2016/0140122 | A1 * | 5/2016 | Harrison ............ H04N 21/4147 707/770 |
| 2016/0189217 | A1 * | 6/2016 | Burgess ............. G06Q 30/0277 705/14.53 |
| 2016/0366483 | A1 * | 12/2016 | Joyce ..................... A63F 13/85 |
| 2017/0097933 | A1 * | 4/2017 | Rajan ................ G06F 16/24578 |
| 2017/0186032 | A1 * | 6/2017 | Rangasamy Kannadasan ............ G06Q 30/0625 |
| 2017/0365083 | A1 * | 12/2017 | Hartrell ................. G06F 18/214 |

OTHER PUBLICATIONS

ISA/CA, International Preliminary Report on Patentability (Ch.1), dated Mar. 19, 2020, re PCT International Patent Application No. PCT/IB2018/056817.

* cited by examiner

GENERATING SEQUENTIAL VISUAL NARRATIVES

CROSS-REFERENCE TO RELATED APPLICATIONS

This application claims priority to U.S. Provisional Patent Application No. 62/555,376, filed Sep. 7, 2017, the entirety of which is incorporated herein by reference.

BACKGROUND

Visual displays may be used to present information about a subject to a viewer in an intuitive and engaging way. Marketing and branding professionals have developed expertise in presenting visual content along with textual content to effectively and succinctly convey messages and information. For example, an advertisement for a real estate listings may include photos of the property along with text descriptions describing features of the property to provide potential buyers with important buying information while visually engaging the potential buyer's interest. However, producing such visual displays is generally be time-consuming and therefore not practical at scale.

SUMMARY

The present specification provides a system which can generate a sequential visual narrative which may be instantiated in a visual display. Such a system may produce visually pleasing, coherent, and narratively satisfying visual displays for the presentation of information on a variety of subjects.

Thus, according to an aspect of the specification, a system for generating a sequential visual narrative is provided. The system includes a media analyzer to obtain media and descriptive data pertaining to a subject and to categorize the media into narrative categories. The system further includes a description generator to process the descriptive data and the narrative categories to generate text descriptions describing the subject in relation to the media. The system further includes a visual display generator to sequence the media in a narrative sequence, map the narrative sequence to a display layout, and to generate and output a visual display including the text descriptions in visual association with the media.

According to another aspect of the specification, a system for generating a sequential visual narrative is provided. The system includes a media analyzer to obtain media and descriptive data. The descriptive data pertains to a subject of which a sequential visual narrative is to be generated. The media includes at least first and second media units pertaining to the subject. The media analyzer categorizes the first and second media units into narrative categories of a predetermined set of narrative categories. The system further includes a description generator to process the descriptive data and the narrative categories of the first and second media units to generate a first natural language text description describing the subject in relation to one or both of the first media unit and the second media unit. The system further includes a visual display generator to sequence the first and second media units in a narrative sequence, map the narrative sequence to a display layout, and to generate and output a visual display including the first natural language text description in visual association with one or both of the first and second media units in accordance with the display layout.

The first natural language text description may describe the subject in relation to the first media unit. The description generator may further generate a second natural language text description describing the subject in relation to the second media unit. The visual display generator may generate and output the visual display including the first natural language text description in visual association with the first media unit and the second natural language text description in visual association with the second media unit.

The media analyzer may categorize the first and second media units into narrative categories based on a probability that a respective media unit belongs in a respective narrative category. The probability may be determined at least in part by application of a text processor to the descriptive data to identify indicia pertaining to the subject, wherein presence of the indicia increases or decreases the probability. The probability may be determined at least in part by application of a text processor to metadata of the respective media unit to identify indicia pertaining to the subject, wherein presence of the indicia increases or decreases the probability. The probability may be determined at least in part by application of an image recognition technique to the respective media unit to identify a salient feature of the subject depicted in the respective media unit, wherein presence of the salient feature increases or decreases the probability. The media analyzer may include a machine learning model trained to categorize images into narrative categories.

The description generator may generate the first natural language text description at least in part by application of a text processor to the descriptive data to identify indicia pertaining to the subject, and may include reference to the indicia in the first natural language text description. The description generator may generate the first natural language text description at least in part by application of a text processor to the descriptive data to identify indicia in metadata of the first or second media unit pertaining to the subject, and may include reference to the indicia in the first natural language text description. The description generator may generate the first natural language text description at least in part by application of an image recognition technique to the first or second media unit to identify a salient feature of the subject depicted in the first or second media unit, and may include reference to the salient feature in the first natural language text description. Further, the media analyzer may include a machine learning model trained to recognize salient features in media units.

The visual display generator may sequence the first and second media units in the narrative sequence based at least in part on application of a text processor to the descriptive data to identify indicia pertaining to the subject, wherein presence of the indicia alters the sequence. The visual display generator may sequence the first and second media units in the narrative sequence based at least in part on application of a text processor to the descriptive data to identify indicia in metadata of the respective media unit pertaining to the subject, wherein presence of the indicia alters the sequence. The visual display generator may sequence the first and second media units in the narrative sequence based at least in part on application of an image recognition technique to the respective media unit to identify a salient feature of the subject depicted in the respective media unit, wherein presence of the salient feature alters the sequence. Further, the visual display generator may sequence the first and second media units in the narrative sequence based at least in part on a number of media units belonging to a particular narrative category.

The visual display generator may select the display layout from a plurality of predetermined display layouts, wherein selection is based at least in part on application of a text processor to the descriptive data to identify indicia pertaining to the subject, wherein presence of the indicia alters selection of the display layout. The visual display generator may select the display layout from a plurality of predetermined display layouts based at least in part on application of a text processor to the descriptive data to identify indicia in metadata of the respective media unit pertaining to the subject, wherein presence of the indicia alters selection of the display layout. The visual display generator may select the display layout from a plurality of predetermined display layouts based at least in part on application of an image recognition technique to the respective media unit to identify a salient feature of the subject depicted in the respective media unit, wherein presence of the salient feature alters selection of the display layout. Further, the visual display generator may select a display layout from a plurality of predetermined display layouts based at least in part on a number of media units belonging to a particular narrative category.

The first and second media units may be captured by a mobile device. The system may include a memory storage unit to store supplementary media, and the visual display generator generates and may output the visual display incorporating the supplementary media in accordance with the display layout. Further, the memory storage unit may store one or both of the media and the descriptive data, and the media analyzer may obtain the one or both of the media and the descriptive data from the memory storage unit. Further, the supplementary media may include branding material. The system may further include a communication interface to receive one or both of the media and the descriptive data via a computer network, wherein the media analyzer may obtain the one or both of the media and the descriptive data from the communication interface.

DETAILED DESCRIPTION

Figure 1:
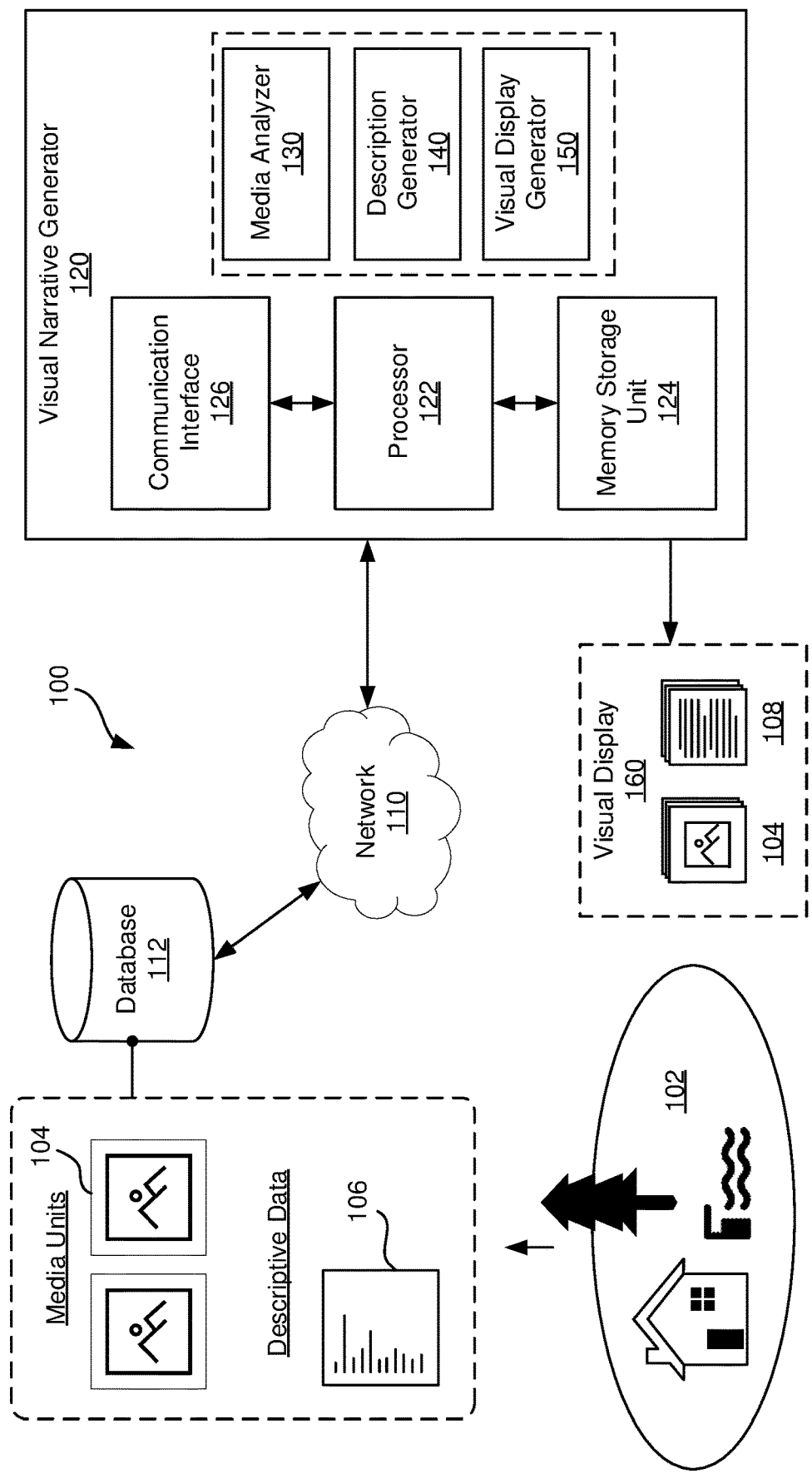
FIG. 1 is a schematic diagram depicting an example system for generating a sequential visual narrative.

A system for generating a sequential visual narrative is provided, which includes a media analyzer, a description generator, and a visual display generator, which cooperate to generate a sequential visual narrative about a subject. The sequential visual narrative may be instantiated in a visual display. The subject may include any subject about which visual media and text descriptions may be provided, such as a product being offered for sale, a family vacation, a real estate listing, a recipe for preparing a meal, a restaurant, etc.

The media analyzer may obtain media pertaining to the subject. As used here, in the term "media unit" may be used to refer to any digital unit of media, including photo files, video files, or any other file or form of data which is computer-readable. Such media units may include metadata including tags or other information relating to the generation of the media unit. The media analyzer which may further obtain descriptive data providing information directly about the subject which may be relevant to understanding, contextualizing, or correcting the media and/or media metadata.

The media analyzer may categorize the media units into narrative categories. For example, where the subject includes a recipe to bake a cake, and the media units include photos of the raw ingredients, photos of a chef performing various steps of the preparation process, and photos showing the final product, the media analyzer may categorize such media units into the categories of: raw ingredients, preparation, and final product.

The description generator may process the descriptive data and the results of the narrative categorization to generate text descriptions, including natural language text descriptions of the subject as it relates to the media units. In other words, the description generator generates natural language text descriptions associated with the media units and provided in the context of the subject. For example, where the subject includes a real estate listing of a home for sale, and the media units include photos and videos and three-dimensional walkthroughs of various rooms in the home, the description generator may generate a description of the home describing its contents and/or descriptions of individual rooms.

The visual display generator may sequence the media units into a narrative sequence, map the narrative sequence to various display layouts, and generate and output a visual display, where the visual display includes the media units incorporated into the various display layouts along with relevant text descriptions placed in visual association with the media units. For example, where the subject includes a family vacation, and the media units include photos and videos of various activities which took place, the visual display may include an electronic flipbook displaying the photos alongside text describing the scenes.

The generation of a sequential visual narrative may involve feature recognition techniques for analyzing the media units and text processing techniques for analyzing the descriptive data. The results of such techniques may contribute toward categorizing the media units, generating the text descriptions, sequencing the media units, mapping the media units to a display layout, and ultimately generating the visual display. As such, the systems provided herein may be used to provide visually pleasing, coherent, and narratively satisfying visual displays for the presentation of information on a variety of subjects. Further, the systems provided herein may through automation provide for the expedient generation of such visual narratives from, for example, a database storing a large quantity of raw media units and descriptive data, or from volumes of user-generated content transmitted over a network.

FIG. 1 depicts an example system 100 for generating a sequential visual narrative. The system 100 includes a database 112 which stores media units 104 and descriptive data 106 pertaining to a subject 102. In the present example, the subject 102 includes a real estate listing being offered for sale. Although depicted as a database 112, it is to be understood that the database 112 may be part of a data storage system including one or more computing devices with storage, communication, and processing means. Further, it is to be understood that the database 112 may include one or more databases. For example, where the subject 102 includes a real estate listing, the database 112 may include a Multiple Listing Service (MLS) data source which provides MLS data feeds. The media units 104 may include photos, videos, and/or three-dimensional walk-throughs of the real estate, and the descriptive data 106 may include real estate data. The media units 104 and descriptive data 106 may be provided in a variety of disparate formats including the RETS (Real Estate Transaction Standard) format and may be encoded in a variety of different formats such as XML or JSON. The media units 104 may be captured by mobile devices, such as smart phones, tablets, digital cameras, video recorders, stereoscopic cameras, wearable devices, and similar.

The system 100 further includes a visual narrative generator 120. The visual narrative generator 120 operates to obtain media units 104 and descriptive data 106 pertaining to the subject 102 and to generate a visual display 160 therefrom, as described herein.

The database 112 and visual narrative generator 120 are in communication over one or more computer networks, indicated as network 110. The network 110 can include the internet, a Wi-Fi network, a local-area network, a wide-area network (WAN), a wireless cellular data network, a virtual private network (VPN), a combination of such, and similar.

The visual narrative generator 120 includes a media analyzer 130 to obtain the media units 104 and the descriptive data 106. The descriptive data 106 pertains to a subject 102 of which a sequential visual narrative is to be generated. The media units 104 include at least first and second media units 104 pertaining to the subject 102. The media analyzer 130 categorizes the media units 104 into narrative categories. The narrative categories are from a predetermined set of narrative categories pertaining to the subject 102. For example, in the example where the subject 102 includes a real estate listing, the narrative categories may relate to specific rooms or features of the real estate, such as: bathroom, living room, kitchen, outdoor, backyard, pool, etc. The media analyzer 130 is discussed in greater detail with reference to FIG. 5.

The visual narrative generator 120 includes a description generator 140 to process the descriptive data 106 and the narrative categories of the first and second media units 104 to generate at least a first text description 108 describing the subject 102 in relation to one or both of the first media unit 104 and the second media unit 104. In other words, the visual narrative generator 102 may generate a text description 108 for an individual media unit 104, a group of media units 104, or a plurality of text descriptions 108 for individual media units 104 or groups of media units 104. For example, a first text description 108 may describe the subject 102 in relation to the first media unit 104, the a second text description 108 may describe the subject 102 in relation to the second media unit 104, and the visual display 160 may include the first text description 108 in visual association with the first media unit 104, and the second text description 108 may be in visual association with the second media unit 104.

The determination of which, and how many, text descriptions 108 are generated may depend on the number of media units 104 belonging to a particular narrative category. For example, in the example where the subject 102 includes a real estate listing, and where several media units 104, such as photos, belong in a category corresponding to a particular room, a text description 108 may be generated for the group of media units 104. In such examples, the group of media units 104 may be displayed collectively in a collage, media carrousel or slideshow, with the text description 108 applying to the group of media units 104. As another example, where only a single media unit 104 belongs in a particular category, such as a backyard category, a text description may be generated for the individual media unit 104. Further still, a text description 108 may be generated to apply to the subject 102 as a whole, and is to be associated with a particular narrative category. For example, a description of an overview of a real estate listing may be generated with reference to the several rooms and features of the property and displayed in associated with an outdoor photo of the property. A variety of combinations of text descriptions 108 with media units 104 are contemplated. The description generator 140 is discussed in greater detail with reference to FIG. 6.

The visual narrative generator 120 includes functional modules, including a visual display generator 150 which sequences the first and second media units 104 in a narrative sequence, maps the narrative sequence to a display layout, and to generates and outputs the visual display 160 including the first text description 108 in visual association with one or both of the first and second media units 104 in accordance with the display layout. The visual display generator 150 is discussed in greater detail with reference to FIG. 7.

The media analyzer 130, description generator 140, and visual display generator 150 may operate via a processor 122, a memory storage unit 124, and a communication interface 126.

Although a single processor 122 is shown, the term "processor" as discussed herein refers to any quantity and combination of a processor, a central processing unit (CPU), a microprocessor, a microcontroller, a field-programmable gate array (FPGA), and similar.

The memory storage unit 124 may include volatile storage and non-volatile storage. Volatile storage may include random-access memory (RAM) or similar. Non-volatile storage may include a hard drive, flash memory, and similar. The memory storage unit 124 may store programming instructions for executing any of the operation of the media analyzer 130, description generator 140, visual display generator 150, or the visual narrative generator 120 generally. The memory storage unit 124 may also store any of copies of media 104, descriptive data 106, media metadata 109, visual displays 160, and/or any data generated from any of the functional modules discussed herein (e.g. category tags, feature tags, probabilities, mapping instructions, as discussed herein).

The communication interface 126 includes programming logic enabling the visual narrative generator 120 to communicate over network 110, is configured for bidirectional data communications through the network 110, and accordingly can include a network adaptor and driver suitable for the type of network used.

The visual narrative generator 120 may obtain media units 104 and descriptive data 106 from one or both of the memory storage unit 124 and the communication interface 126.

Further, it is to be understood that the media analyzer 130, description generator 140, and visual display generator 150 may be implemented as separate processor-executable programs, within the same processor-executable program, or as combinations of processor-executable programs, and by the same computing device, separate computing devices, or combinations of computing devices.

Figure 2:
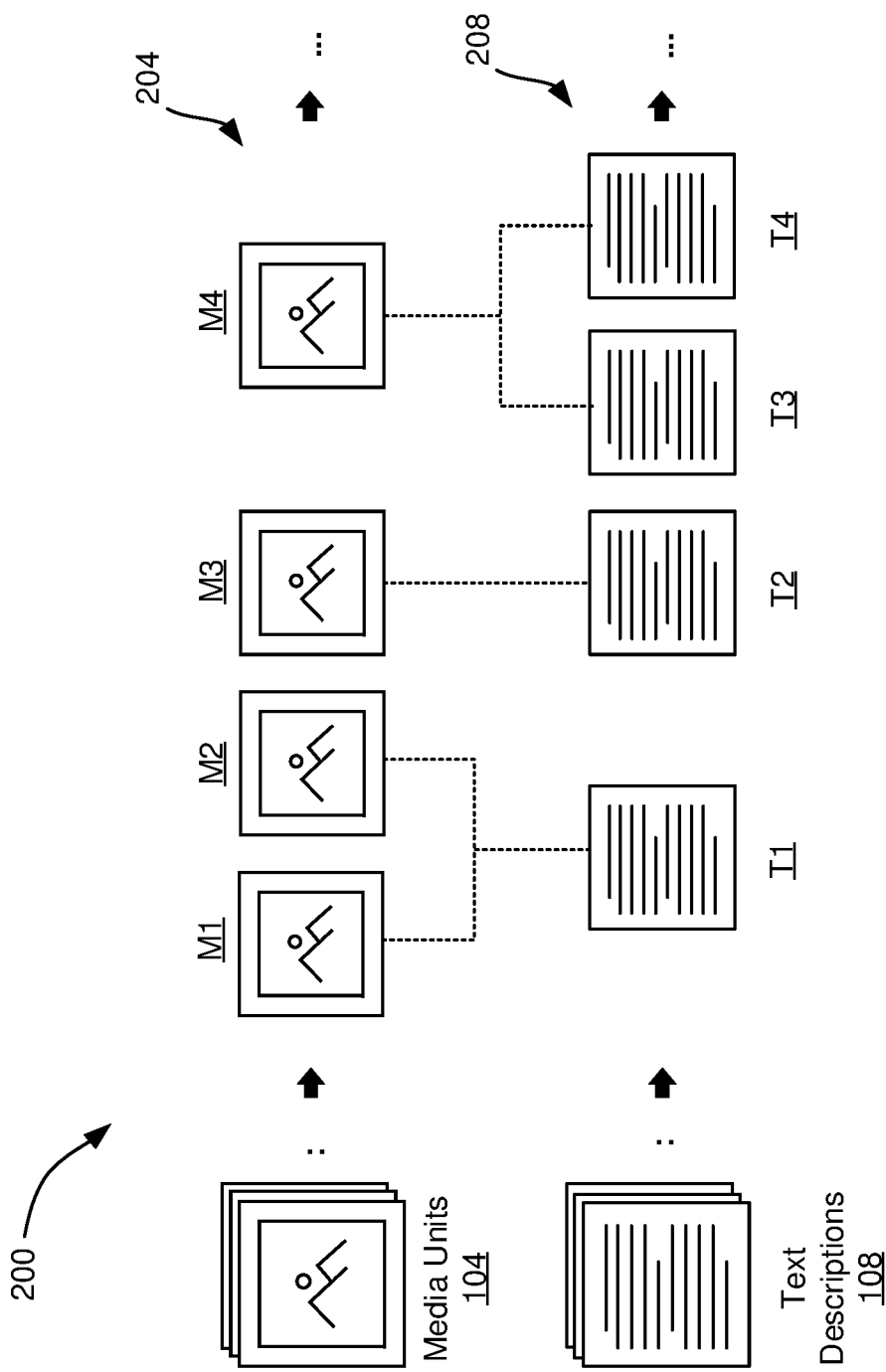
FIG. 2 is a schematic diagram depicting an example narrative sequence of media units and associated text descriptions.

FIG. 2 is a schematic diagram depicting an example narrative sequence 200 of media units 104 and associated text descriptions 108. The media units 104 are sequenced to be presented in the order: M1, M2, M3, to M4, which is denoted the media sequence 204. The text descriptions 108, which are associated with media units 104, thus follow the sequence: T1, T2, T3, to T4, which is denoted as the text sequence 208. As discussed in greater detail below, the media sequence 204 and/or text sequence 208 may be generated based on any number of criteria to produce an engaging visual narrative for viewing.

Figure 3:
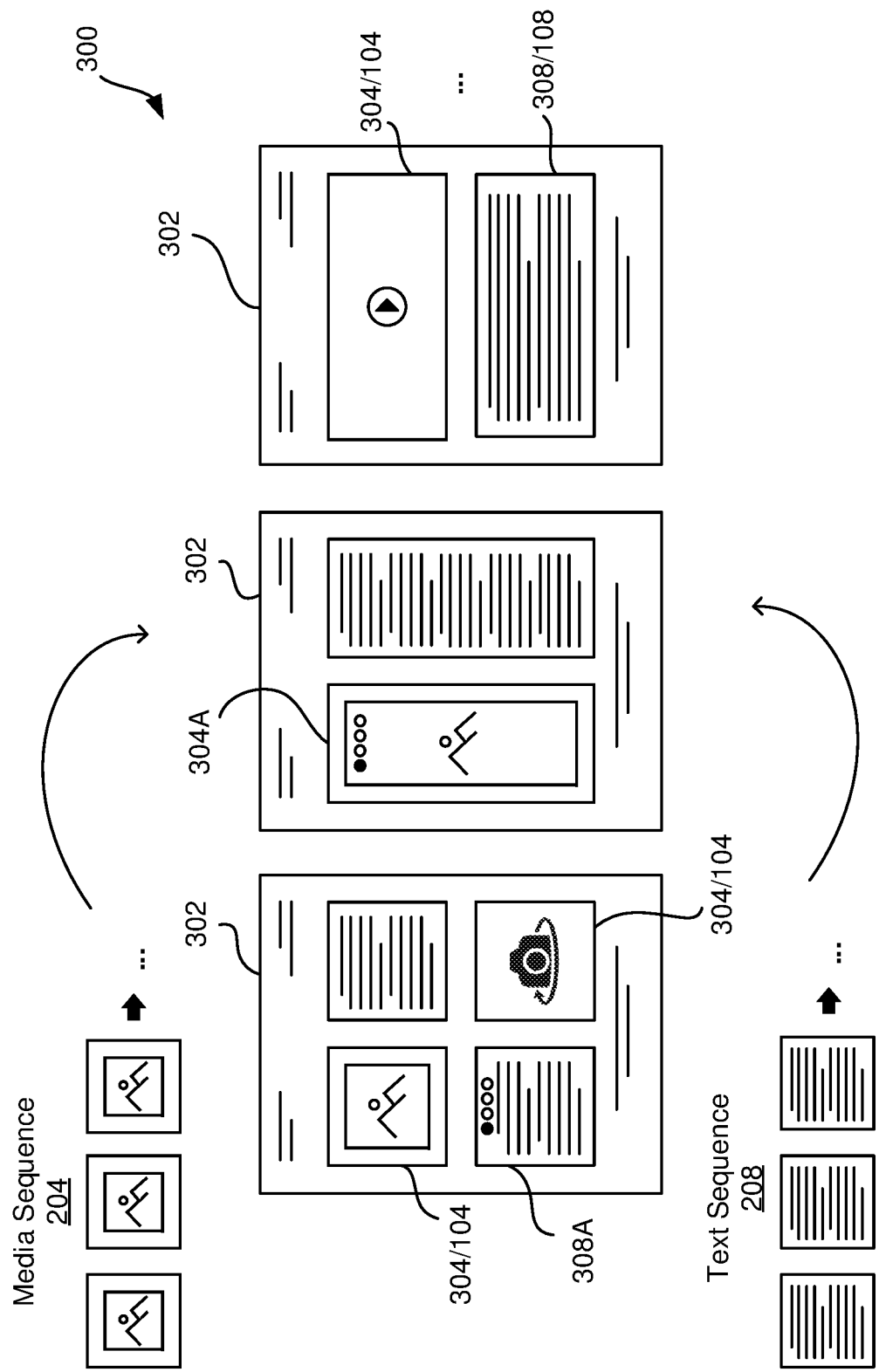
FIG. 3 is a schematic diagram depicting an example visual display including a media sequence and text descriptions mapped to example display layouts.

FIG. 3 is a schematic diagram depicting an example visual display 300 showing a media sequence 204 and text sequence 208 mapped to example display layouts 302. A display layout 302 may include a layout for media units 104 to be presented, along with text descriptions 108 in visual association with the media units 104, along with other visual elements. In some examples, a display layout 302 may include one or more media slots 304 to which one or more media units 104 may be assigned, and text slots 308 to which one or more text descriptions 108 may be assigned.

A text slot 308 may be arranged in visual association with a media slot 304 by being located visually adjacent to a media slot 304, overlapping with a media slot 304, by including similar or complementary visual cues such as borders or backgrounds which indicate association, or by any other technique for visually associating elements on a display.

In some examples, a display layout 302 may include a grouped media slot 304A for displaying a plurality of media units 104. A grouped media slot 304A may include a media carrousel which periodically displays different media units 104 in the group, or which may be swiped or otherwise interacted with to display different media units 104. A grouped media slot 304A may include a collage or other element for displaying a plurality of grouped media units 104. Further, in some examples, a display layout 302 may include a grouped text slot 308A. Similarly, a grouped text slot 308A may include a text carrousel which periodically displays different text descriptions 108 in the group, or which may be swiped or otherwise interacted with to display different text descriptions 108. Similarly, a grouped text slot 308A may include other arrangements of text for displaying a plurality of grouped text descriptions 108.

In some examples, the visual display 300 may be stored and presented electronically as a digital book, digital magazine, slideshow, webpage (e.g. HTML or HTML5 file) a social media post, an HTML5 flipbook, a print-ready PDF, an interactive PDF, a flash-based output, or similar. In other examples, the visual display 300 may be printed and assembled as a book, magazine, pamphlet, flyer, or similar. A display layout 302 may refer to the arrangement of media slots 304 and text slots 308 on a single "page", or across a plurality of "pages". For example, where the visual display 300 is to be presented as a printed or digital book or magazine, a display layout 302 may span two adjacent "pages", i.e. a "spread", which are to be viewed simultaneously.

Figure 4:
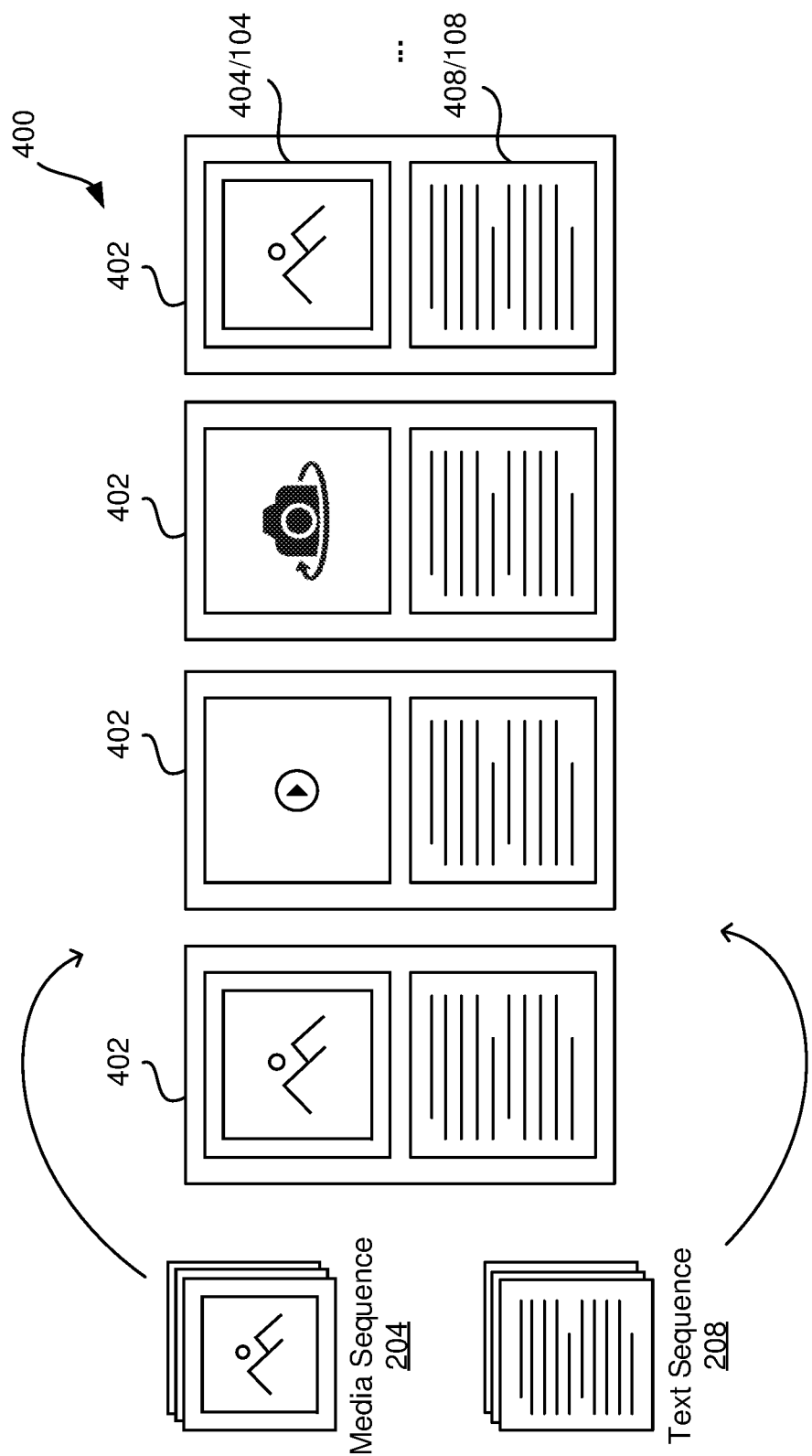
FIG. 4 is a schematic diagram depicting another example visual display.

FIG. 4 is a schematic diagram depicting an example visual display 400. The example visual display 400 is similar to the visual display 300 with like components having like numbers, however in a "400" series rater than a "300" series. Thus, the visual display 400 includes display layouts 402 including media slots 404 for media units 104 from media sequence 204 and text slots 408 for text descriptions 108 from text sequence 208. For further description of the above elements of the visual display 400, the description of the visual display 300 of FIG. 3 may be referenced. In visual display 400, however, the media slots 404 and text slots 408 are arranged in a compact arrangement with only a single media slot 404 and text slot 408 viewable on a "page". This compact arrangement may be suitable for viewing of the visual display 400 on a device having a small screen, including a mobile device, such as a smart phone, tablet, or similar.

Figure 5:
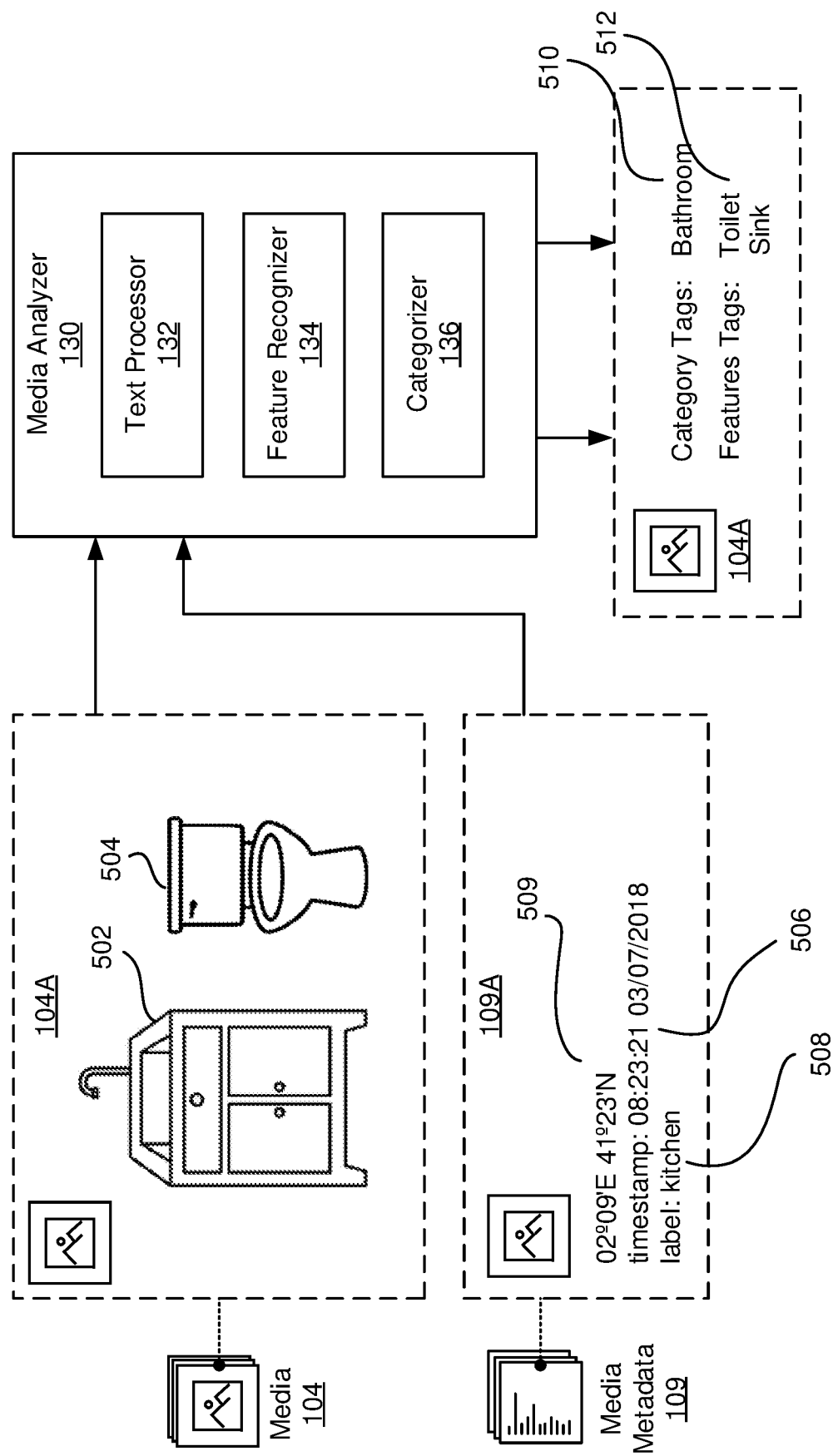
FIG. 5 is a schematic diagram depicting operation of an example media analyzer to categorize an example media unit.

FIG. 5 is a schematic diagram depicting operation of the media analyzer 130. The media analyzer 130 includes a text processor 132 to process text in media metadata 109, a feature recognizer 134 to recognize features in media units 104, and categorizer 136 to categorize media units 104. In the example shown, the subject 102 includes a real estate listing, and a media unit 104A includes a photo taken in a room of the property. The media unit 104A (e.g. the photo file) has associated media metadata 109A. The media metadata 109A includes indicia such as the timestamp 506 indicating when the photo was taken, a label 508 to describe the contents of the photo, location data 509 indicating where the photo was taken, or other information.

The media analyzer 130 categorizes media units 104 into narrative categories based on a probability that a media unit 104 belongs in a narrative category. The probability that a media unit 104 belongs in a particular narrative category may depend on a number of factors and/or criteria. An algorithm for determining the probability may be provided via algorithms executed by the categorizer 136. Determination of the probability that a given media unit 104 belongs in a given narrative category may be aided by the text processor 132 and feature recognizer 134.

The probability may be determined, at least in part, by application of the text processor 132 to media metadata 109 to identify indicia pertaining to the subject 102. For example, the text processor 132 may extract the label 508 "kitchen" from the media metadata 109A to count toward whether the media unit 104A belongs in the category "kitchen" or not. The presence of such a label may increase the probability that the media unit 104A belongs in the category. The presence of other indicia, or the weighting of other factors, may reinforce this finding to increase the probability, or may count against this finding to decrease the probability. Application of the text processor 132 may involve application of natural language processing techniques to extract indicia from natural language.

The text processor 132 may also be applied to the descriptive data 106 (FIG. 1) to identify indicia therein, where, similarly, the presence of indicia may decrease or increase the probability that the media unit 104A belongs in a narrative category. The finding of indicia, or lack thereof, in the descriptive data 106, may interact with the finding, or lack thereof, of indicia in the media metadata 109, in determining the probability that a media unit 104 belongs in a narrative category.

Further, the probability may be determined, at least in part, by application of the feature recognizer 134 to media units 104 to identify indicia pertaining to the subject 102. The feature recognizer 134 may employ various image recognition or feature recognition techniques to identify salient features in media units 104. For example, the feature recognizer 134 may recognize the image of a sink 502 and a toilet 504 in the media unit 104A. Identification of these indicia, or features, may count toward whether the media unit 104A belongs in the category "kitchen" or "bathroom" or another category. The presence of such visual features may increase the probability that the media unit 104A belongs in the category. The presence of other indicia, or the weighting of other factors, may reinforce this finding to increase the probability, or may count against this finding to decrease the probability. For example, the categorizer 136 may weigh the finding of the feature "toilet" in the media unit 104A to count against the finding of the label "kitchen" in the media metadata 109A, and accordingly may increase the probability that the media unit 104A is a photo of a bathroom, and decrease the probability that the media unit 104A is a photo of a kitchen. Thus, the categorizer 136 in cooperation with the text processor 132 and/or feature recognizer 134 may correct errors in the media metadata 109 and/or descriptive data 106.

The media analyzer 130 may output category tags 510 which indicate which category or categories which were determined to apply to the media units 104 and/or feature tags 512 which indicate salient features which were determined to be present in the media units 104. For example, with respect to the media unit 104A, the media analyzer 130 may output the category tag 510 "bathroom" and the feature tags 512 "toil" and "sink".

The feature recognizer 134 may include a machine learning model trained to recognize features in media units 104. The machine learning model may include a convolutional neural network (CNN) or capsule neural network (CapsNet). Similarly, the categorizer 136 may also include a machine learning model trained to categorize images into narrative categories. This machine learning model may also include a CNN or CapsNet. In general, such CNNs or CapsNets may be generated with sufficient training data (e.g., photos of each category) using any one of a number of CNN or CapsNet architectures. In some examples, where the subject 102 relates to real estate listings, the restb.ai API may be used for both categorization and feature detection in real estate. The CNN or CapsNet for the categorizer 136 may return a probability estimate of the top categories the image is predicted to belong to, and the CNN or CapsNet of the feature recognizer 134 may return a set of bounding boxes and feature description(s) for each, alongside a probability estimate of the detection of said feature(s).

Further, it is to be understood that the text processor 132, feature recognizer 134, and categorizer 136 may be implemented as separate processor-executable programs, within the same processor-executable program, or as combinations of processor-executable programs, and by the same computing device, separate computing devices, or combinations of computing devices.

Figure 6:
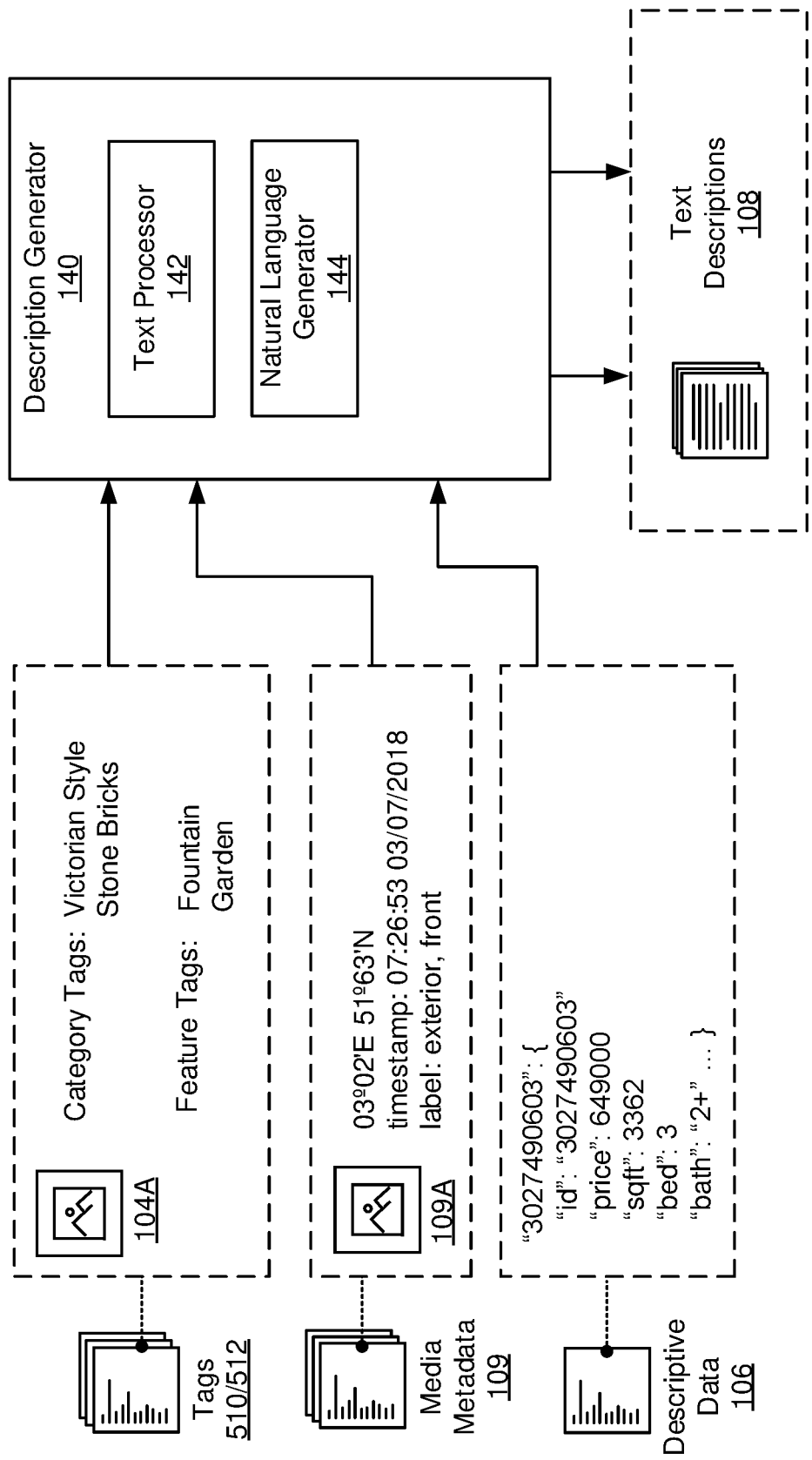
FIG. 6 is a schematic diagram depicting operation of an example description generator to generate a text description.

FIG. 6 is a schematic diagram depicting operation of the description generator 140. The description generator 140 includes a text processor 142 to process media metadata 109, category tags 510, and/or feature tags 512 and a natural language generator 144 to generate text descriptions 108. In the example shown, the subject 102 includes a real estate listing. A particular a media unit 104A has been determined to be an outdoor photo of a property build from stone bricks in a Victorian style and featuring a fountain and a garden. The media unit 104A (e.g. the photo file) has associated media metadata 109A, which indicates location, timestamp, and labels. The descriptive data 106 describes the property with an "id", a "price", a "sqft" (square footage), a (number of) "bed" (bedrooms), and a (number of) "bath" (bathrooms).

The text processor 142 analyzes the descriptive data 106 to identify indicia pertaining to the subject 102 to include reference to the indicia into text descriptions 108. For example, the text processor 142 may read media metadata 109 associated with media units 104 to identify indicia for inclusion into text descriptions 108. The text processor 142 may extract the label "kitchen" for inclusion into text descriptions 108, such as, for example, to generate a text description 108 related to a kitchen, to be placed in visual association with a particular media unit 104. In general, indicia extracted from media metadata 109 may include any information related to an associated media unit 104. Application of the text processor 142 may involve application of natural language processing techniques to extract indicia from natural language.

The natural language generator 144 employs natural language generation techniques to generate text descriptions 108 describing the subject 102 in relation to media units 104, as described herein. Generation of the text descriptions 108 may involve consideration of the category tags 510 and/or feature tags 512, the descriptive data 106, and/or media metadata 109. The natural language generator 144 may cooperate with the feature recognizer 134 to generate text descriptions 108 at least in part by application of an image recognition technique to media units 104 to identify salient features of the subject 102 for inclusion into the text descriptions 108. For example, where the subject 102 includes a property, and where a particular media unit 104 is determined to include a fountain as indicated by a feature tag 512, a text description 108 may be provided of the property which includes reference to a fountain. As discussed below, the description generator 140 cooperates with the visual display generator 150 to determine for which media units 104, or groups of media units 104, text descriptions 108 are to be generated and associated thereto.

In general, the natural language generator 144 may employ any kind of natural language generation system that will accept selected text content as input and will output sentences summarizing the text provided as input may be used. The natural language generation system may be trained to produce sentences summarizing a list of features found in a selection of various media units. The natural language generation system may involve a text or content selection component, a sentence planner, and a sentence realization component that outputs the summary text.

Further, it is to be understood that the text processor 142 and natural language generator 144 may be implemented as separate processor-executable programs, within the same processor-executable program, or as combinations of processor-executable programs, and by the same computing device, separate computing devices, or combinations of computing devices.

Figure 7:
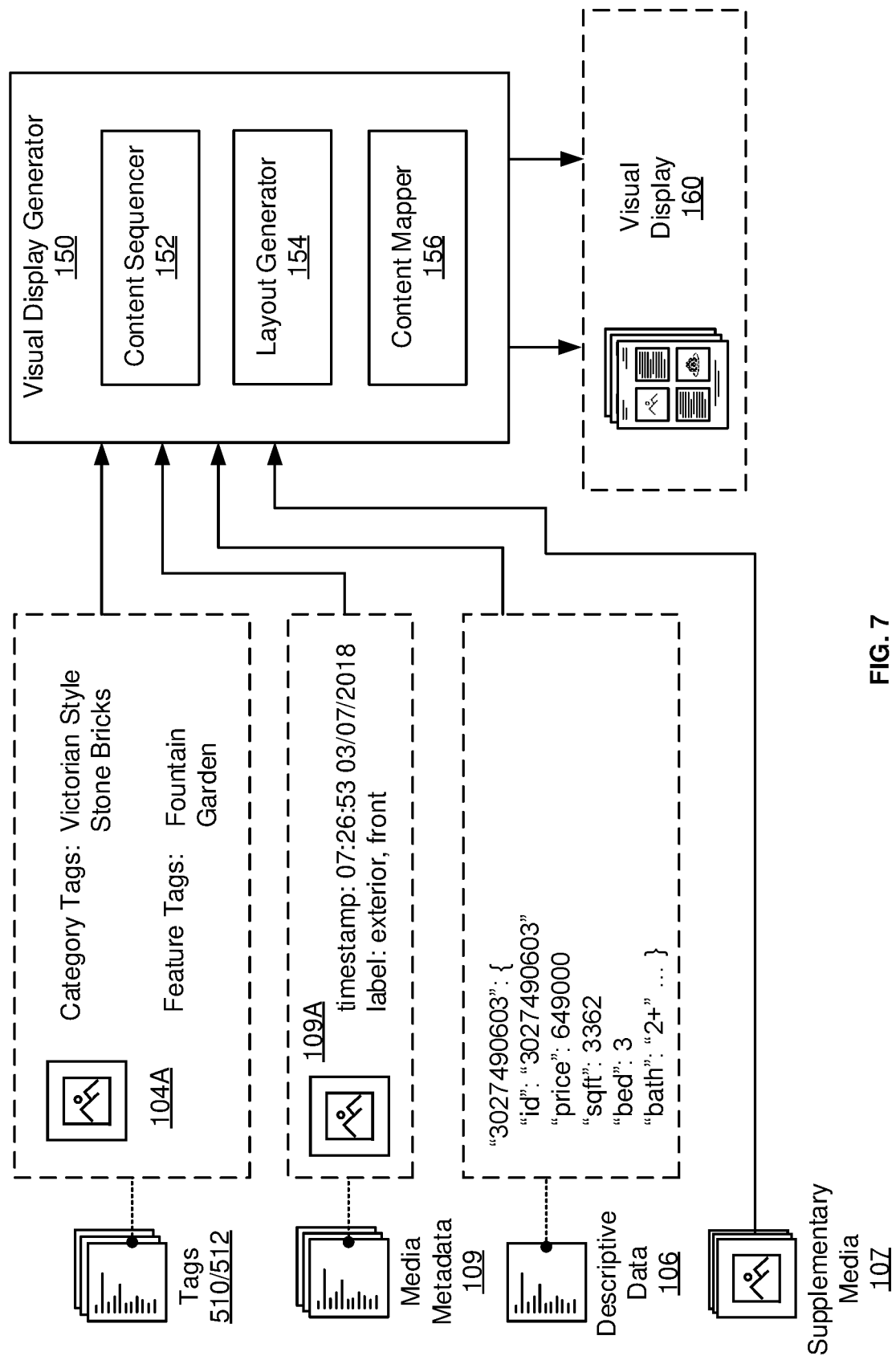
FIG. 7 is a schematic diagram depicting operation of an example visual display generator to generate a visual display.

FIG. 7 is a schematic diagram depicting operation of the visual display generator 150. The visual display generator 150 includes a content sequencer 152 to associate media units 104 to text descriptions 108 in a narrative sequence, a layout generator 154 to generate display layouts to contain media units 104 and text descriptions 108 in visual association, and a content mapper 156 to map the media units 104 and text descriptions 108 to the display layouts. In the example shown, the subject 102 includes a real estate listing. A particular a media unit 104A has been determined to be an outdoor photo of a property build from stone bricks in a Victorian style and featuring a fountain and a garden. The media unit 104A (e.g. the photo file) has associated media metadata 109A, which indicates location, timestamp, and labels. The descriptive data 106 describes the property with an "id", a "price", a "sqft" (square footage), a (number of) "bed" (bedrooms), and a (number of) "bath" (bathrooms).

The content sequencer 152 generates media sequences 204 and text sequences 208 and associates media units 104 to text descriptions 108 in a narrative sequence 200 (FIG. 2). Sequencing of the media units 104 may involve, for example, application of a text processor to the descriptive data 106 to identify indicia pertaining to the subject 102. Presence of an indicia may alter the sequence. Sequencing of the media units 104 may involve application of a text processor to the descriptive data to identify indicia in media metadata 109 of a media unit 104 pertaining to the subject 102, where, similarly, presence of the indicia may alter the sequence. Sequencing of the media units 104 may involve application of an image recognition technique to media units 104 to identify a salient feature of the subject depicted in the media units 104, wherein presence of the salient feature may alter the sequence. Further, association of media units 104 with text descriptions 108 may involve any of the above techniques. In some examples, the content sequencer 152 may group a plurality of media units 104 together for association with a single text description 108 (see M1, M2, T1, in FIG. 2). In some examples, the content sequencer 152 may group a plurality of text descriptions 108 together for association with a single media unit 104 (see M4, T3, T4, in FIG. 2). In such examples, the content sequence 152 may associate media slots 304 in a visual display 300 with the group of media units 104, and text slots 308 with text descriptions 108.

In some examples, the content sequencer 152 may sequence media units 104 based at least in part on a number of media units 104 belonging to a particular narrative category. For example, where the subject 102 includes a real estate listing, and the media units 104 include a single outdoor photo of the property, that photo may appear at the beginning of a media sequence 204, and where the media units 104 includes several outdoor photos of the property, one or more of those photos may be sequenced at the end of the media sequence 204. In some examples, the content sequencer 152 may associate media units 104 with text descriptions 108 based at least in part on a number of media units 104 belonging to a particular narrative category. For example, where the media units 104 include several pictures of bathrooms, each media unit 104 pertaining to a bathroom may be grouped together and associated with a single text description 108. Such a group of media units 104 may be displayed together in a media carrousel or other combined form.

The layout generator 154 generates display layouts 302 to contain media units 104 and text descriptions 108 in visual association in a visual display 300 (FIG. 3). A display layout 302 may include any arrangement of visual and textual elements, such as media units 104 and text descriptions 108, which provides a sequential narrative describing a subject 102 (FIG. 3, FIG. 4).

The layout generator 154 may generate display layouts 302 by selecting display layouts 302 from a plurality of predetermined display layouts. The selection of display layouts 302 may involve, for example, application of a text processor to the descriptive data 106 to identify indicia pertaining to the subject 102. Presence of the indicia may alter selection of the display layout 302. The selection of display layouts 302 may involve application of a text processor to media metadata 109 to identify indicia in media metadata 109 of media units 104 pertaining to the subject 102, where, similarly, presence of the indicia may alters selection of display layouts 302. Further, the selection of display layouts 302 may involve application of an image recognition technique to media units 104 to identify salient features of the subject 102 depicted in the media units 104, where presence of salient features may alter selection of display layouts.

In some examples, the layout generator 154 may select display layouts 302 from a plurality of predetermined display layouts based at least in part on a number of media units 104 belonging to a particular narrative category. For example, where the subject 102 includes a real estate listing, and the media units 104 include several photographs of a living room, a display layout 302 may be selected which may concurrently display a plurality of such photos.

The content mapper 156 maps the media units 104 and text descriptions 108 to the display layouts 302. In some examples, in operation, the content mapper 156 provides instructions referencing a location address for each media unit 104, made up of a "page" number, a slot number, and a position in that slot, for each display layout 302. Thus for example, a first media unit 104 may be sent to a third "page", in a fourth media slot 304, at a particular position in that slot. Mapping instructions may be based at least in part on category tags 510 and descriptive data 106 according to a set of rules that groups and orders media units 104 on the basis of their category membership, and then assigns those media units 104 to a particular "page" number and slot number (address) in a narrative sequence.

The content sequencer 152, layout generator 154, and content mapper 156 may cooperate, e.g. iteratively, to fit an appropriate number of media units 104, media slots 304, descriptive text 108 and text slots 308, into display layouts 302, whether selected from predetermined layouts, or dynamically generated.

Further, the sequencing and mapping of media and text may involve application of a machine learning model, such as a neural network or a Bayesian learning model, trained with example visual narratives where media and text has been mapped by human users. In such examples, a machine learning model may be trained on a prior training set of media and text mapped to display layouts by users to learn a ruleset for assigning media and text to slots. Other applications of machine learning models are contemplated, wherein, similarly, a sequence-to-sequence mapping problem is solved by providing training data of how a human user may map a list of media to a list of slots and pages, and a neural network is constructed to emulate that mapping.

The visual display generator may also obtain supplementary media 107 for incorporation into a visual display 300. Supplementary media 107 may include visual elements relevant to the subject 102 which may not necessarily be included in media units 104, such as addition aesthetic elements. Further, supplementary media 107 may be selected for inclusion into a visual display 300 at least in part based on the presence of indicia in the descriptive data 106. For example, where the subject 102 includes a real estate listing, and the descriptive data 106 includes indicia that the property includes a pool, but the media units 104 do not include any imagery of the pool, a supplementary media 107 including a visual element representing a pool (e.g. a "stock" image), may be selected for inclusion into a display layout 302. Further, such a supplementary media 107 may be displayed in visual association with a text description 108 which includes reference to the pool. A variety of supplementary media 107 may be stored in memory storage unit 124 for such use.

In some examples, the supplementary media 107 may include branding material. In such examples, a visual display 300 may be generated cooperatively by an individual and a sponsor, affiliate, or other organization. For example, where the subject 102 relates to a vacation where an individual stayed at a particular resort, a visual display 300 may be generated which includes media units 104 provided by the individual in addition to branding material provided by the resort. Thus, an individual may be provided with a platform for generating visual narratives for personal use and for sharing with others, such as through social media, and a sponsor may be provided with a platform for disseminating branding material.

Additional rules may be followed by the visual display generator 150 in the generation of visual display 160. In some examples, generation of the visual display 160 may be dynamic with respect to variables such as the device or user account used to view the visual display 160. In some examples, one or more of sequencing by the content sequencer 152, display layout generation by the layout generator 154, content mapping by the content mapper 156, and/or addition of supplementary media 107, may vary with respect to variables such as the device or user account used to view the visual display 160. For example, supplementary media 107 added to the visual display 160 may vary depending on user factors as determined from the user's device or user account. For example, the supplementary media 107 provided may vary with respect to the location of a user's device. As another example, where it is determined that a user's device is located in the vicinity of a particular retail chain of an advertiser, supplementary media 107 may include an advertisement for the retailer including details about the particular retain chain. As yet another example, where a user's account is tagged as having an interest in a certain topic, the supplementary media 107 may include advertising content related to those certain topics. As yet another example, where the user's account is tagged as having an interest in a certain topic, media units 104 which belong in categories relevant to, or which include features relevant to, that certain topic, may be advanced in the sequence of media units 104 toward the beginning of the visual display 160. As yet another example, where a user is searching for a real estate listing to purchase or rent, and the user's account includes indications that the user is interested in a property having a particular number of bedrooms and washrooms and certain amenities, a visual display 160 of a real estate listing may generated according to sequencing, layout, and/or mapping rules which elevate the presentation of information relevant to such interests, i.e., which confirm or disconfirm whether the real estate listing includes the number of bedrooms, washrooms, and amenities, indicated as desirable by the user's account.

Further, it is to be understood that the content sequencer 152, layout generator 154, and content mapper 156 may be implemented as separate processor-executable programs, within the same processor-executable program, or as combinations of processor-executable programs, and by the same computing device, separate computing devices, or combinations of computing devices.

Figure 8:
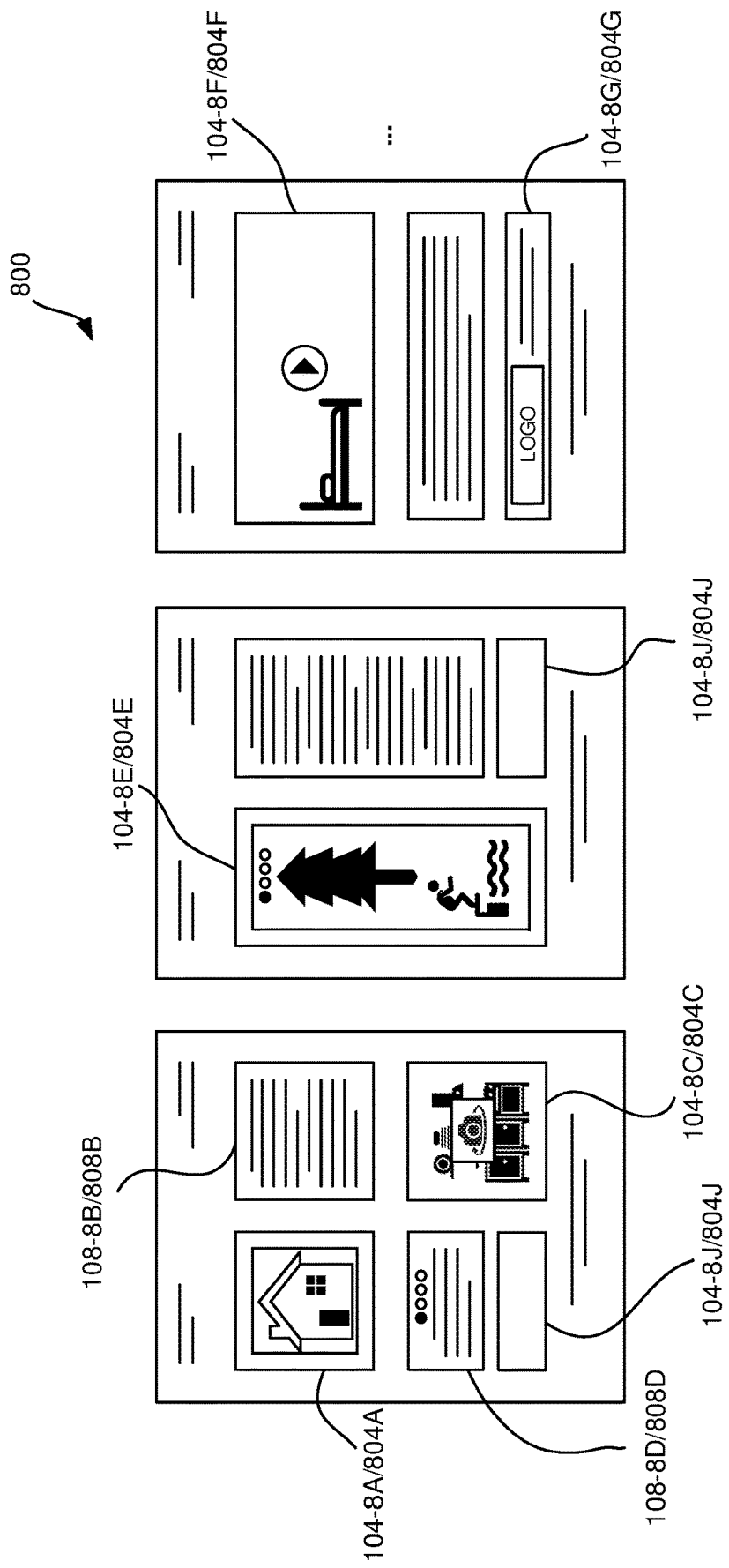
FIG. 8 is a schematic diagram depicting an example visual display of a real estate listing.

FIG. 8 is a schematic diagram depicting an example visual display 800. The example visual display 800 presents a real estate listing being offered for sale. The example visual display 800 is similar to the visual display 300 with like components having like numbers, however in a "800" series rather than a "300" series. Thus, the visual display 800 includes media slots 804 (media slots 804A, 804C, 804E, 804F) for media units 104 (104-8A, 104-8C, 104-8E, 104-8F) from a media sequence and text slots 808 (808B, 808D) for text descriptions 108 (108-8B, 108-8D) from a text sequence. For further description of the above elements of the visual display 800, the description of the visual display 300 of FIG. 3. The media slot 804A contains a media unit 104-8A which may include a photo of the property from the front exterior. The text slot 808B contains a text description 108-8B which may describe general characteristics of the property and neighborhood, and is placed in visual association with the media unit 104-8A (adjacent and to the right thereof). The media slot 804C contains a media unit 104-8C which may include a three-dimensional walkthrough or panorama of a primary living space on the property. The text slot 808D contains several text descriptions 104-8D in a carrousel describing features of the property which may be visible in the media unit 104-8C, and is placed in visual association with the media unit 104-8C (adjacent and to the left thereof). The media slot 804E contains a carrousel of media units 104-8E including photos of the exterior of the property. The media slot 804F contains a media unit 104-8F including a video tour of the property. Further, the visual display 800 includes a supplementary media slot 804G including supplementary media 104-8G, which may include a logo, other branding materials and/or information about the developer of the property. The visual display 800 further includes a plurality of supplementary media slots 804J containing supplementary media 104-8J which may provide aesthetic elements.

Figure 9:
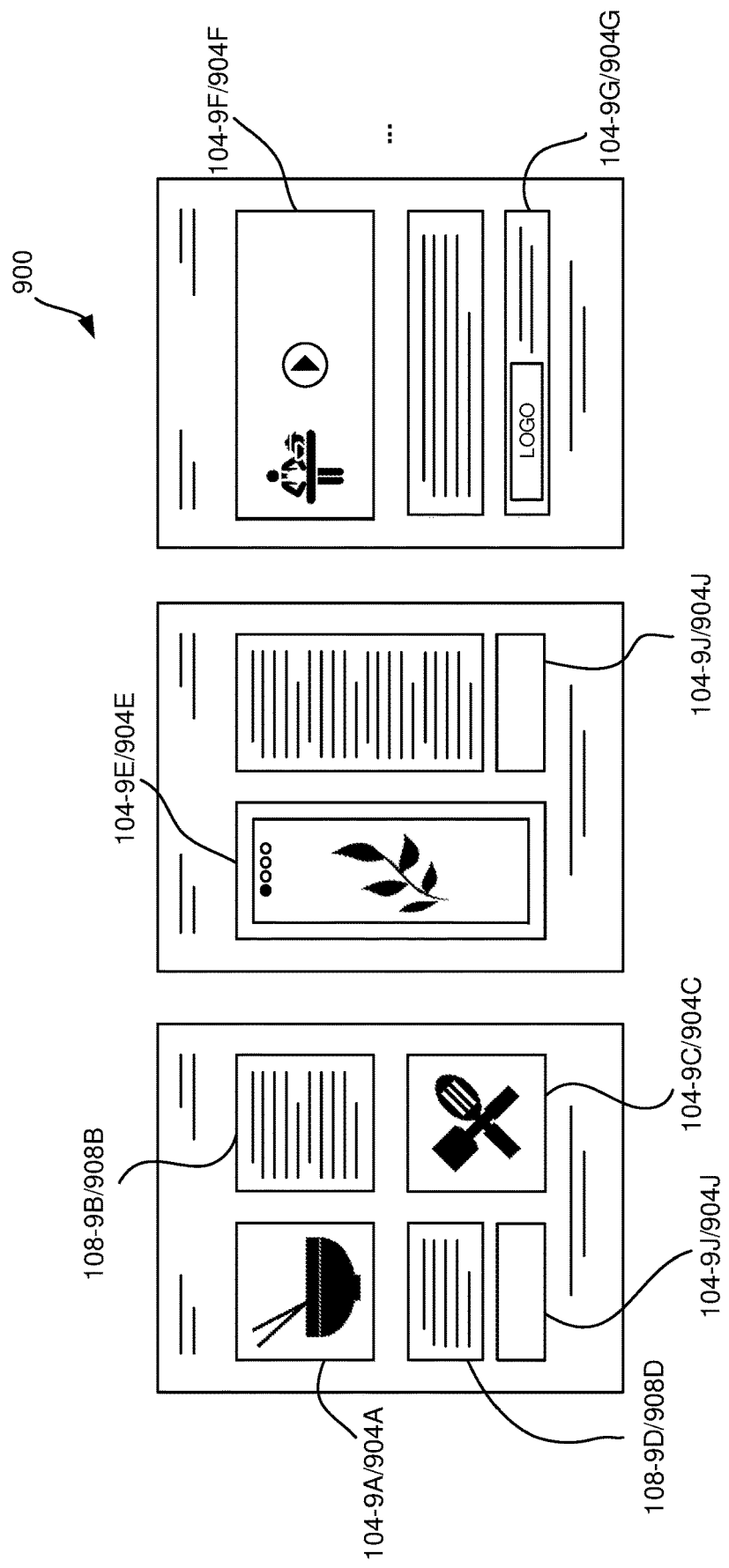
FIG. 9 is a schematic diagram depicting an example visual display of a recipe for preparing a meal.

FIG. 9 is a schematic diagram depicting an example visual display 900. The example visual display 900 presents a recipe for preparing a meal. The example visual display 900 is similar to the visual display 300 with like components having like numbers, however in a "900" series rather than a "300" series. Thus, the visual display 900 includes media slots 904 (media slots 904A, 904C, 904E, 904F) for media units 104 (104-9A, 104-9C, 104-9E, 104-9F) from a media sequence and text slots 908 (908B, 908D) for text descriptions 108 (108-9B, 108-9D) from a text sequence. For further description of the above elements of the visual display 900, the description of the visual display 300 of FIG. 3. The media slot 904A contains a media unit 104-9A which may include a photo of the prepared meal. The text slot 908B contains a text description 108-9B which may describe the contents and flavours of the meal, and is placed in visual association with the media unit 104-9A (adjacent and to the right thereof). The media slot 904C contains a media unit 104-9C which may include a collage of the culinary implements necessary to prepare the meal. The text slot 908D contains a text descriptions 104-9D listing the ingredients and/or the culinary implements which may be visible in the media unit 104-9C, and is placed in visual association with the media unit 104-9C (adjacent and to the left thereof). The media slot 904E contains a carrousel of media units 104-9E including photos of the meal at various preparatory stages. The media slot 904F contains a media unit 104-9F including a video of a professional chef preparing the meal. Further, the visual display 900 includes a supplementary media slot 904G including supplementary media 104-9G, which may include a logo, other branding materials and/or information about the provider of the recipe. The visual display 900 further includes a plurality of supplementary media slots 904J containing supplementary media 104-9J which may provide aesthetic elements.

Figure 10:
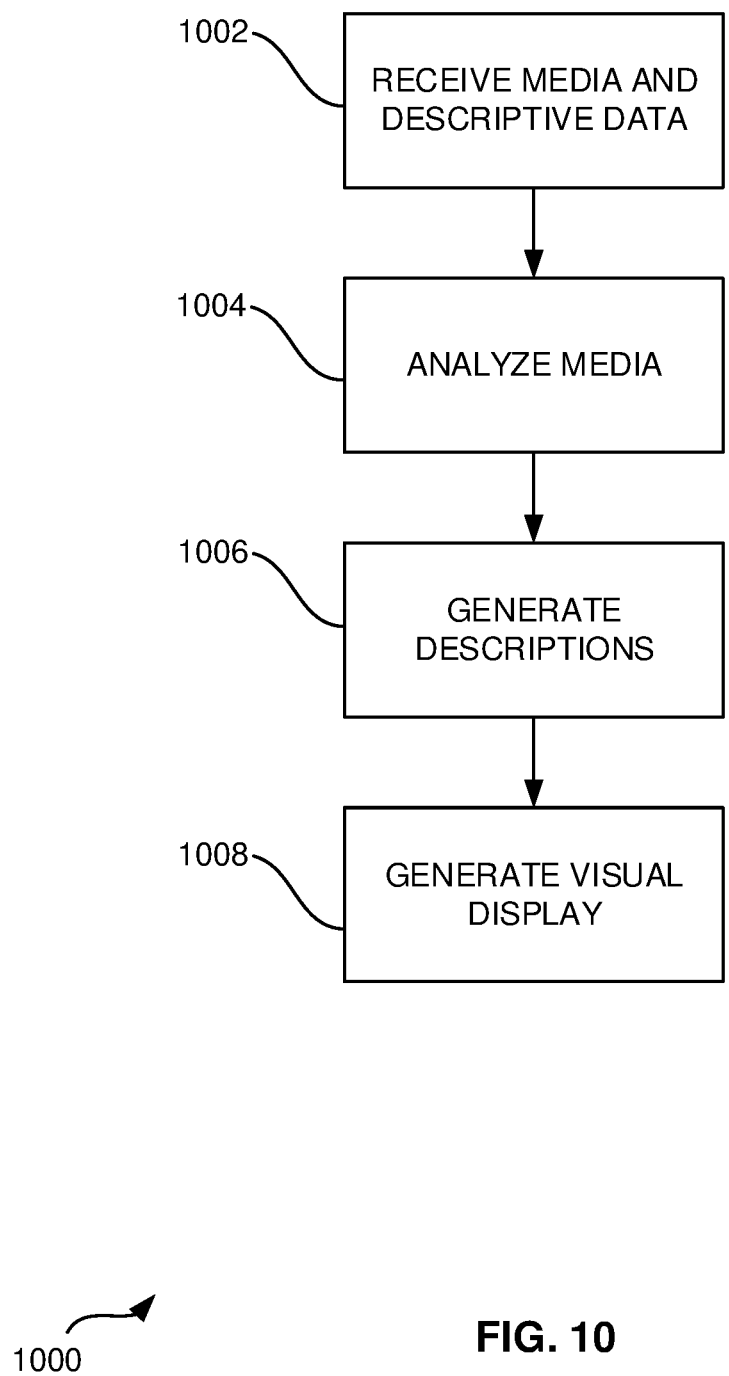
FIG. 10 is a flowchart depicting an example method for generating a sequential visual narrative.

FIG. 10 is a flowchart depicting an example method 1000 for generating a sequential visual narrative. The method 1000 is one way in which a sequential visual narrative may be generated. It is to be emphasized, however, that the blocks of method 1000 need not be performed in the exact sequence as shown. Further, the method 1000 may be performed by a system described above, such as system 100. For clarity, the method 1000 has been described with reference to the system 100, but this is not limiting, and the method 1000 may be performed by other systems and/or devices.

At block 1002, the media analyzer 130 obtains media, including media units 104 and media metadata 109, and descriptive data 106. The media and descriptive data 106 may be obtained by being extracted from the memory storage unit 124 or by being received from the communication interface 126. Obtaining the media and descriptive data 106 may also involve ingesting, cleaning, and/or formatting, the media and descriptive data 106, to harmonize data obtained from disparate sources and/or to correct input errors. Further, obtaining the data may involve munging and/or consolidating the data to eliminate redundancies and compile the data into a consistent data schema. Further, obtaining the data may involve normalizing the data to standardize the format of presentation of text and media. At block 1004, the media analyzer 130 categorizes the media units 104 into narrative categories, as described herein. At block 1006, the description generator 140 processes the narrative categories and the descriptive data to generate text descriptions describing the subject in relation to the media, as described herein. At block 1008, the visual display generator 150 sequences the media into a narrative sequence, maps the narrative sequence to display layouts, and generates and outputs a visual display including text descriptions in visual association with the media, as described herein. Thus, a visually pleasing, coherent, and narratively satisfying visual narrative may be generated automatically and expediently.

Figure 11:
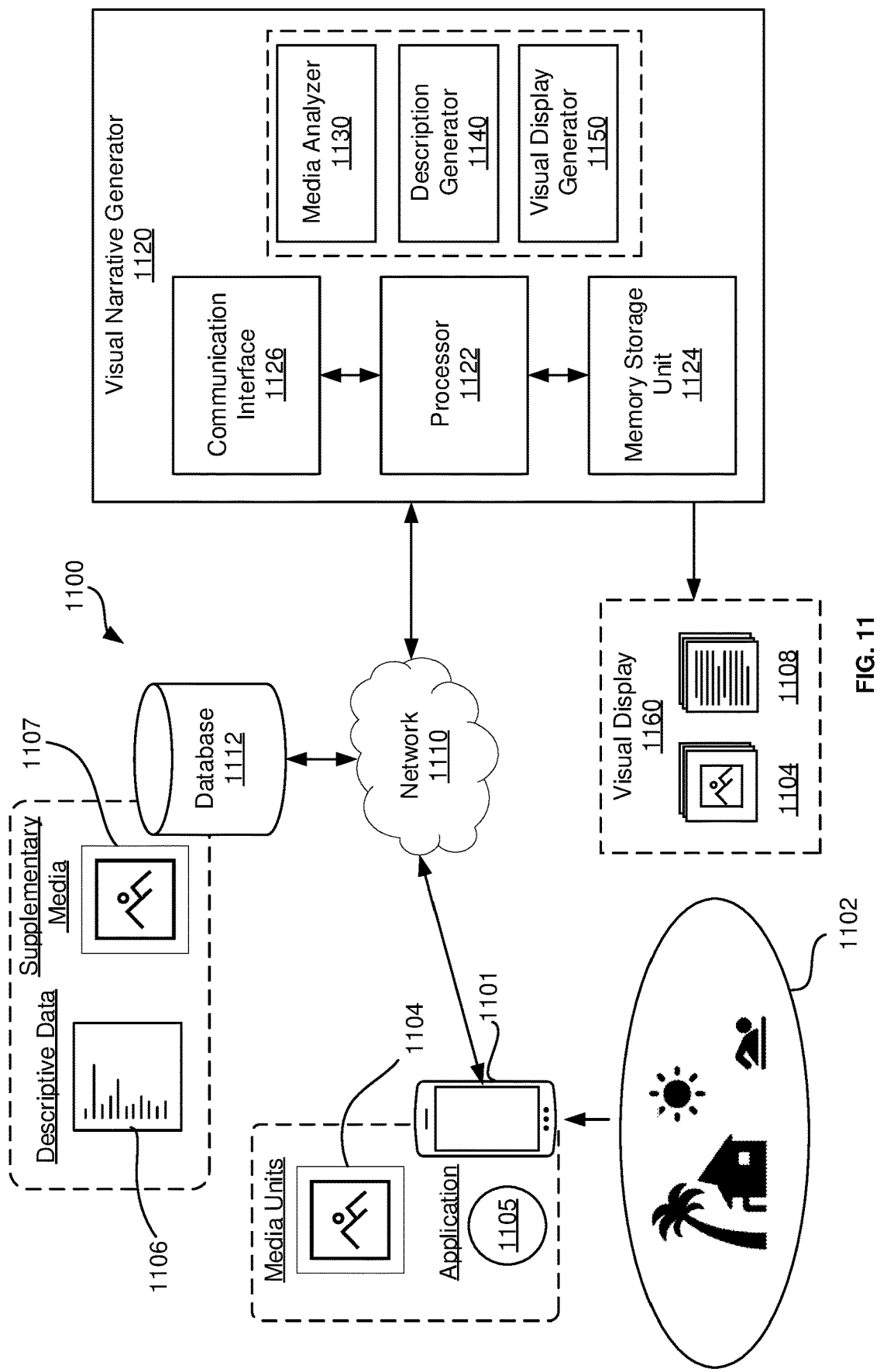
FIG. 11 is a schematic diagram depicting another example system for generating a sequential visual narrative.

FIG. 11 is a schematic diagram depicting an example system 1100 for generating a sequential visual narrative. The system 1100 is similar to the system 100 with like components having like numbers, however in a "1100" series rather than a "100" series. Thus, the system 1100 includes a network 1110, a database 1112 containing descriptive data 1106, and a visual narrative generator 1120. The visual narrative generator 1120 includes a communication interface 1126, a processor 1122, and a memory storage unit 1124, and further includes a media analyzer 1130, description generator 1140, and visual display generator 1150. The visual narrative generator 1120 generates a visual display 1160 including media units 1104 and text descriptions 1108 relating to a subject 1102. For further description of the above elements of the system 1100, the description of the system 100 of FIG. 1. Further, the database 1112 contains supplementary media 1107 including visual elements such as aesthetic elements for incorporation into the visual display 1160. Further, the system 1100 includes a mobile device 1101, which obtains the media units 1104, and runs a software application 1105 to communicate with the visual narrative generator 1120 to generate the visual display 1160.

The software application 1105 may allow an individual to capture media, such as photos, videos, or other media, to be transmitted to visual narrative generator 1120 for inclusion in the visual display 1160. The visual narrative generator 1120 may include supplementary media 1107, such as additional visual aesthetics, backgrounds, logos, branding material, or other media elements into the visual display 1160. Thus, the visual display 1160 may be a jointly developed product between the user of the mobile device 1101 and the visual narrative generator 1120.

The software application 1105 may allow the individual to edit or modify the visual display 1160 after generation by the visual narrative generator 1120, and may further allow the individual to share the visual display 1160 with other individuals, such as through social media platforms. Thus, the software application 1105 may be configured to conform the visual display 1160 to the formatting requirements of any given social media or other dissemination platform. Such an arrangement may be particularly desirable where a sponsor, affiliate, or other organization wishes to engage with individuals to jointly develop visual displays for sharing over social media platforms, where the individual is provided with a means for generating a sequential visual narrative, and the organization is provided with marketing and branding opportunities.

Figure 12:
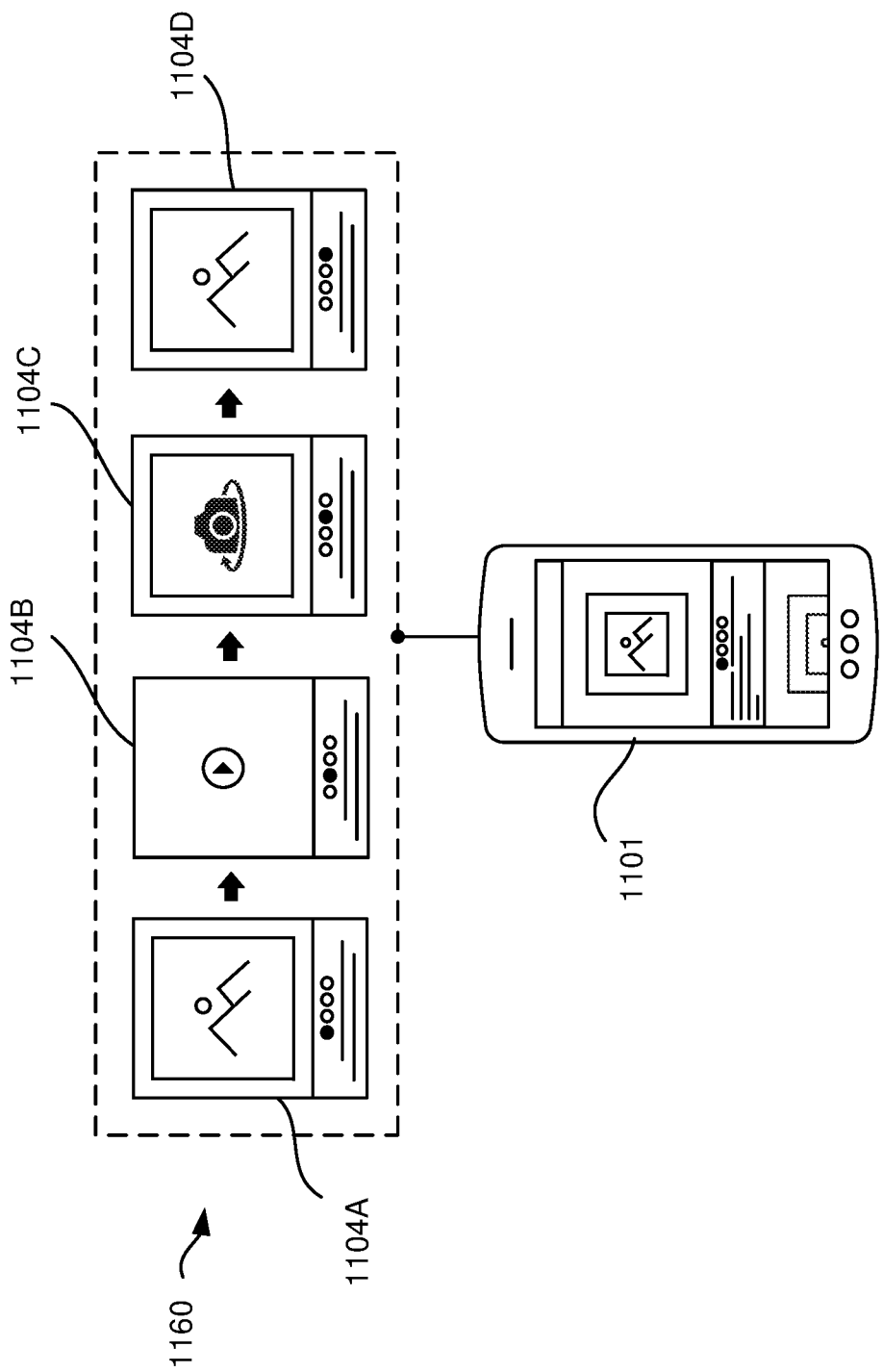
FIG. 12 is a schematic diagram depicting an example mobile device viewing an example sequential visual narrative.

FIG. 12 is a schematic diagram depicting the mobile device 1101 viewing the visual display 1160 via a social media application. A visual display 1160 may be "posted" to a social media platform and made viewable by individuals as a "post". In the present example, a post comprises the visual display 1160 is presented as media carrousel comprising an image 1104A, a video 1104B, a panoramic image 1104C, and another image 1104D. Individuals on the social media platform may interact with the visual display 1160 as they would other social media posts, including commenting and sharing the media.

Further, as discussed above with respect to system 100, it is contemplated that the visual display 1160 may be dynamically generated, or altered, depending on a device or a user's social media account used to view the visual display 1160. Any of the sequence of the content, the generated display layout, the content mapping, and/or the addition of supplementary media 1107, may be so dynamically generated or altered.

A non-limiting example of an algorithmic scheme for mapping media and text to a sequential visual narrative for use in a visual display will now be described. The following scheme may be applied using any of the systems described herein, but this is not limiting, and the scheme may be applied in other systems.

First, a set of Indexed Page Layouts is defined as $\Pi=\{P_j|P_1, P_2, \ldots\}$ and a set of Indexed Image Slots is defined as $\Sigma=\{S^i_j|S_1^1, S_1^2, \ldots S_2^1, S_2^2, \ldots\}$ such that a Slot $S^i_j$ is found on page RI. Suppose a given data structure $\Delta$ comprises a large set of records, including media and associated textual data, from which a sequential visual narrative is to be generated. An ordered, labelled, Category List is defined as $\gamma=\{C_1, C_2, \ldots C_n\}$ containing Category Labels $C_n$ pertaining to the various possible narrative categories to which any of the media in $\Delta$ may belong. For simplicity, each media will be assumed to be an image, but it is understood that media may include an image, video, three-dimensional walk-through, or other visual media.

Let $\rho$ be a record in $\Delta$ comprising a set of images $i=\{I_1, I_2, \ldots\}$ and associated textual data. Let $\Phi$ be a Category Tally Function that takes the vector of images in i $(I_1, I_2, \ldots)$ to its associated ordered Category Tally Vector $(\#_{C1}, \#_{C2}, \ldots \#_{Cn})$ where $\#_{Cn}$ denotes the total number of images in $i=\{I_1, I_2, \ldots\}$ having a Category Label $C_n$.

An Assignment Instruction is defined as $\alpha_j^i = (P_j, S^i_j, \Gamma)$ where $\Gamma$ is some ordered vector of labelled images in the set $i=\{I_1, I_2, \ldots\}$ For example, $\Gamma=(I_4, I_{11}, I_2, I_9)$.

An Assignment is defined as an ordered vector of Assignment Instructions of the form $\Lambda=(n_1, n_2, \ldots)=((\alpha_j^1, \alpha_j^2, \ldots)(\alpha_k^1, \alpha_k^2, \ldots), \text{ where } (n_1, n_2, \ldots)$ represents the assignments for each "page" of the sequential visual narrative, that satisfies the following conditions:

A) Every categorized image in $i=\{I_1, I_2, \ldots\}$ has some assignment instruction $\alpha_j i$ in the set $\Lambda$ assigning it to some slot $S^i J$ on some page RI B) For every Page $P_j$ of $\Pi$ that appears in some Assignment instruction $\alpha_j^i$ in $\Lambda$, every image slot $S^i_j$ of $P_j$ has at least one image assigned to it from the set $i=\{I_1, I_2, \ldots\}$ Further, any number (including none) of the following constraints that limit the type of Assignment Instructions $\alpha_j^i$ may be employed. Where any constraints are employed, a further condition of the Assignment Instructions in that all such conditions are satisfied.

Category Ordering Constraint: A partial or total ordering of the narrative categories in the set thereof such that image categories only appear throughout the sequential visual narrative $(n_1, n_2, \ldots)$ in a page-wise order congruent with this specified ordering.

Category Slideshow Adjacency Relation Constraint: A reflexive, possibly symmetric and/or transitive relation on the set of narrative categories that is used to determine which categories are "compatible" with others in the same image slot. This relation could also satisfy a condition of congruence with the category ordering—namely, categories are only permitted to be adjacent if they are "near" each other on the order.

Category Page Adjacency Relation Constraint: In schemes that allow for multiple slots on a page, this is a reflexive, possibly symmetric and/or transitive relation on the set of categories that is used to determine which categories are "compatible" with others on the same page. This relation could also satisfy a condition of congruence with the category ordering—namely, categories are only permitted to be adjacent if they are "near" each other on the order.

Category Spread Adjacency Relation Constraint: In schemes that allow for distinct spreads of pages instead of merely single pages, a reflexive, possibly symmetric and/or transitive relation on the set of categories that is used to determine which categories are "compatible" with others in the same slideshow. This relation could also satisfy a condition of congruence with the Category ordering—namely, categories are only permitted to be adjacent if they are "near" each other on the order.

Finally, a Layout Assignment Ruleset (LAR) $\Psi$ is defined as a mapping $\Psi: \#^n \to \Lambda$ from the space of all possible Category Tally Vectors $\#^n$ to the space $\Lambda$ of all possible Assignments. A LAR may be understood as an over-arching "ruleset" that governs a particular sequential visual narrative design. A LAR may be defined in many different ways depending on the context. For example, a LAR may be defined via fixed contextual rules. For example, a particular reseller of real estate may prefer a particular ordering of narrative categories (e.g., outdoor, living space, kitchen, bedrooms, bathroom). As another example, bayesian learning implementations, neural networks, various supervised learning implementations, or other means. For example, a LAR may be defined by a machine learning model trained to generate LARs which satisfy user feedback.

Thus, media and associated text descriptions from a record may be mapped to a sequential visual narrative by determining a desired LAR, determining a Category Tally Vector $(\Phi(I_1, I_2, \ldots):=(\#_{C1}, \#_{C2}, \ldots \#_{Cn})$, determining an Assignment and resulting Assignment Instructions in accordance with the LAR and the Category Tally Vector, computing the associated page layouts and sequence of page layouts from the Assignment Instructions, mapping the images into the stipulated slots according to the Assignment Instructions, and mapping the text descriptions into the corresponding slots.

Thus, a system is provided which generates sequential visual narratives, which may be instantiated in visual displays, from input media and data. The system may be applied to generate large volumes of visually pleasing and narratively engaging content efficiently and expediently to facilitate the marketing of large volumes of unique products, such as, for example, real estate listings. The system may also be applied to the generation of personalized content. In particular, the system may be applied to generate personalized content which is blended with sponsorship or marketing material.

Persons skilled in the art will appreciate that there are yet more alternative examples and modifications possible, and that the above examples are only illustrations of one or more examples. The scope, therefore, is only to be limited by the claims appended hereto.

The invention claimed is:

1. A system for generating a sequential visual narrative, comprising:

a processor;

a communications interface connected to the processor;

a memory connected to the processor, the memory to store instructions that are executable by the processor;

a media analyzer including instructions executable by the processor, the media analyzer to obtain media and descriptive data, the descriptive data pertaining to a subject of which a sequential visual narrative is to be generated, the media including at least first and second media units pertaining to the subject, and to categorize the first and second media units into narrative categories of a predetermined set of narrative categories;

a description generator including instructions executable by the processor, the description generator to process the descriptive data and the narrative categories of the first and second media units to generate a first natural language text description describing the subject in relation to one or both of the first media unit and the second media unit, wherein the first natural language text description includes a textual narrative of the descriptive data;

a visual display generator including instructions executable by the processor, the visual display generator to sequence the first and second media units in a narrative sequence, map the narrative sequence to a display layout, and to generate and output a visual display including the first natural language text description in visual association with one or both of the first and second media units in accordance with the display layout, wherein the description generator cooperates with the visual display generator to generate the first natural language text description; and instructions to train a machine learning model to interpret usage of a plurality of devices that are operable to connect to the system via the communications interface;

wherein the visual display generator dynamically generates the narrative sequence, including determining a relative ordering of the first and second media units in the narrative sequence, using the machine learning model that is trained to interpret usage of the plurality of devices that are operable to connect to the system via the communications interface, wherein the narrative sequence is generated as specific to a user's device that connects to the system via the communications interface to receive output of generate the visual display.

2. The system of claim 1, wherein the first natural language text description describes the subject in relation to the first media unit, the description generator further generates a second natural language text description describing the subject in relation to the second media unit, and the visual display generator generates and outputs the visual display including the first natural language text description in visual association with the first media unit and the second natural language text description in visual association with the second media unit.

3. The system of claim 1, wherein the media analyzer is to categorize the first and second media units into narrative categories based on a probability that a respective media unit belongs in a respective narrative category.

4. The system of claim 3, wherein the probability is determined at least in part by application of a text processor to the descriptive data to identify indicia pertaining to the subject, wherein presence of the indicia increases or decreases the probability.

5. The system of claim 3, wherein the probability is determined at least in part by application of a text processor to metadata of the respective media unit to identify indicia pertaining to the subject, wherein presence of the indicia increases or decreases the probability.

6. The system of claim 3, wherein the probability is determined at least in part by application of an image recognition technique to the respective media unit to identify a salient feature of the subject depicted in the respective media unit, wherein presence of the salient feature increases or decreases the probability.

7. The system of claim 6, wherein the media analyzer comprises the or another machine learning model trained to categorize images into narrative categories.

8. The system of claim 1, wherein the description generator is to generate the first natural language text description at least in part by application of a text processor to the descriptive data to identify indicia pertaining to the subject, and to include reference to the indicia in the first natural language text description.

9. The system of claim 1, wherein the description generator is to generate the first natural language text description at least in part by application of a text processor to the descriptive data to identify indicia in metadata of the first or second media unit pertaining to the subject, and to include reference to the indicia in the first natural language text description.

10. The system of claim 1, wherein the description generator is to generate the first natural language text description at least in part by application of an image recognition technique to the first or second media unit to identify a salient feature of the subject depicted in the first or second media unit, and to include reference to the salient feature in the first natural language text description.

11. The system of claim 10, wherein the media analyzer comprises the or another machine learning model trained to recognize salient features in media units.

12. The system of claim 1, wherein the visual display generator is to sequence the first and second media units in the narrative sequence based at least in part on one or more of:

application of a text processor to the descriptive data to identify indicia pertaining to the subject, wherein presence of the indicia alters the sequence;

application of a text processor to the descriptive data to identify indicia in metadata of the respective media unit pertaining to the subject, wherein presence of the indicia alters the sequence; and application of an image recognition technique to the respective media unit to identify a salient feature of the subject depicted in the respective media unit, wherein presence of the salient feature alters the sequence.

13. The system of claim 1, wherein the visual display generator is to sequence the first and second media units in the narrative sequence based at least in part on a number of media units belonging to a particular narrative category.

14. The system of claim 1, wherein the visual display generator selects the display layout from a plurality of predetermined display layouts, wherein selection is based at least in part on one or more of:

application of a text processor to the descriptive data to identify indicia pertaining to the subject, wherein presence of the indicia alters selection of the display layout;

application of a text processor to the descriptive data to identify indicia in metadata of the respective media unit pertaining to the subject, wherein presence of the indicia alters selection of the display layout; and application of an image recognition technique to the respective media unit to identify a salient feature of the subject depicted in the respective media unit, wherein presence of the salient feature alters selection of the display layout.

15. The system of claim 1, wherein the visual display generator is to select a display layout from a plurality of predetermined display layouts based at least in part on a number of media units belonging to a particular narrative category.

16. The system of claim 1, wherein the system further includes a memory storage unit to store supplementary media, and the visual display generator generates and outputs the visual display incorporating the supplementary media in accordance with the display layout.

17. The system of claim 16, wherein the first and second media units are captured by a mobile device, and wherein the supplementary media includes branding material.

18. The system of claim 1, wherein the system further comprises a communication interface to receive one or both of the media and the descriptive data via a computer network, and wherein the media analyzer obtains the one or both of the media and the descriptive data from the communication interface.

19. The system of claim 1, wherein the system further comprises a memory storage unit to store one or both of the media and the descriptive data, and wherein the media analyzer obtains the one or both of the media and the descriptive data from the memory storage unit.

20. A system for generating a sequential visual narrative comprising:

a processor;

a communications interface connected to the processor;

a memory connected to the processor, the memory to store instructions that are executable by the processor;

a media analyzer including instructions executable by the processor, the media analyzer to obtain media and descriptive data pertaining to a subject and to categorize the media into narrative categories;

a description generator including instructions executable by the processor, the description generator to process the descriptive data and the narrative categories to generate text descriptions describing the subject in relation to the media, wherein the text descriptions include a textual narrative of the descriptive data;

instructions to train a machine learning model to interpret usage of a plurality of devices that are operable to connect to the system via the communications interface; and a visual display generator to sequence the media in a narrative sequence, map the narrative sequence to a display layout, and to generate and output a visual display including the text descriptions in visual association with the media, wherein the description generator cooperates with the visual display generator to generate the first natural language text description, and wherein the visual display generator dynamically generates the narrative sequence, including determining a relative ordering of first and second elements of the media in the narrative sequence, using the machine learning model that is trained to interpret usage of the plurality of devices that are operable to connect to the system via the communications interface, wherein the narrative sequence is generated as specific to a user's device that connects to the system via the communications interface to receive output of the visual display.

21. The system of claim 1, wherein the machine learning model is trained on a prior training set of media and text mapped to display layouts by users to learn a ruleset for ordering media and text into the narrative sequence.

\* \* \* \* \*